Figure 1:
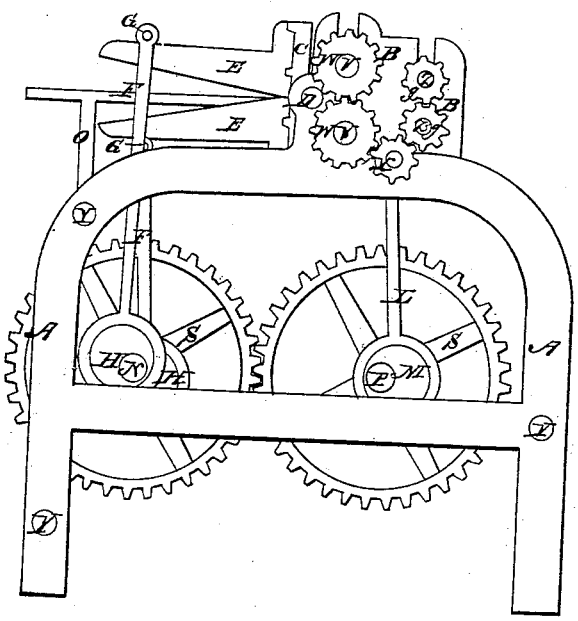
Figure 2:
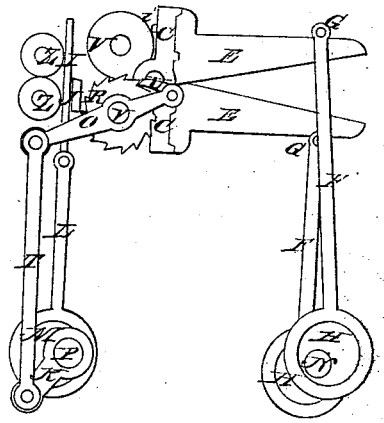
Figure 4:
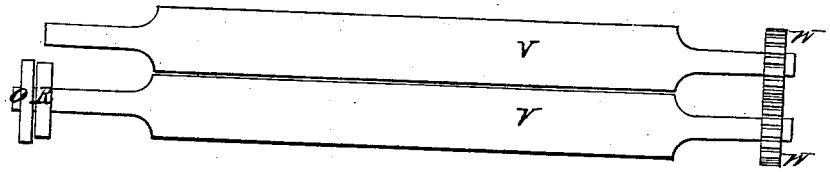
Figure 5:
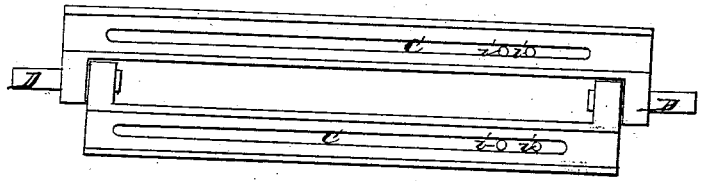
Figure 6:
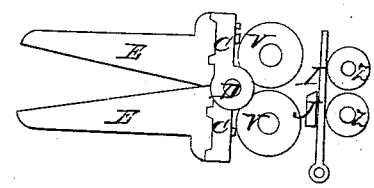
Figure 3:
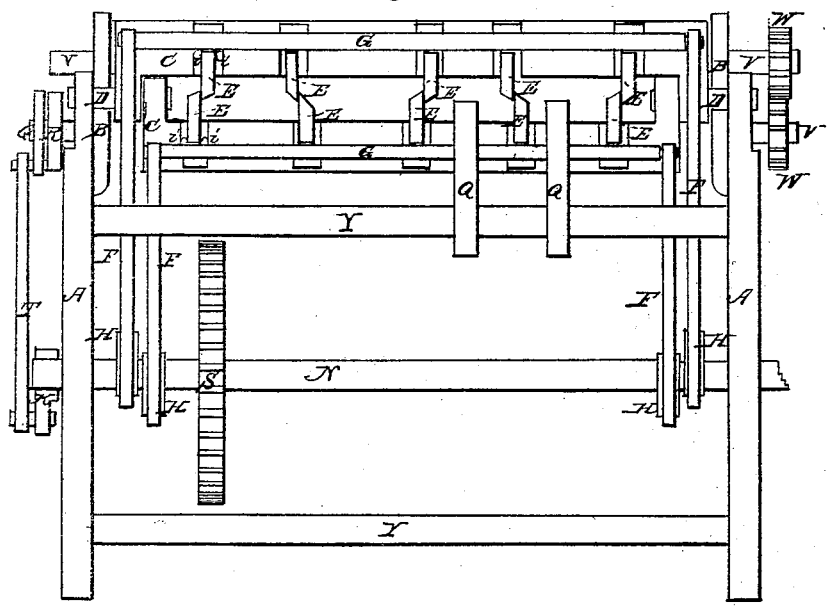
Figure 7:
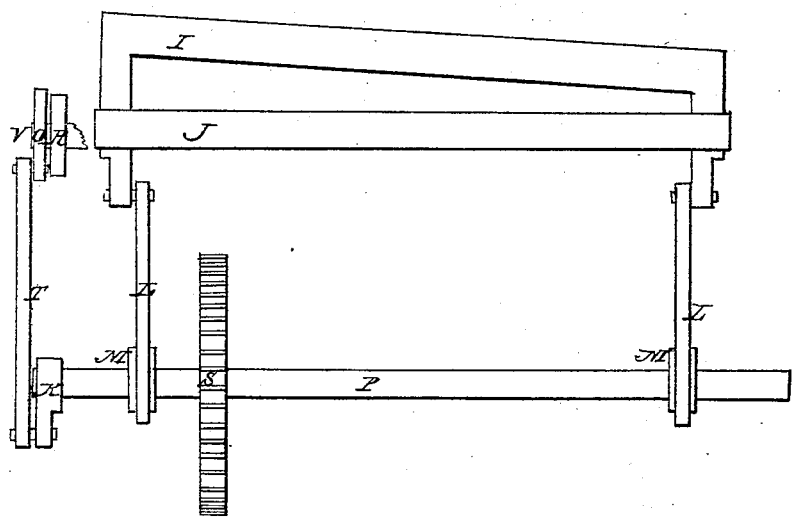

J. A. Elder.
Pasteboard Cutting Mach.
Nº 10,122. Patented Oct. 11, 1853.

J. A. Elder.
Pasteboard Cutting Mach.
Nº 10,122. Patented Oct. 11, 1853.

UNITED STATES PATENT OFFICE.

JOHN A. ELDER, OF WESTBROOK, MAINE, ASSIGNOR TO JOHN E. COFFIN, OF SACCASAPPA, MAINE.

MACHINE FOR CUTTING BINDERS' BOARDS.

Specification of Letters Patent No. 10,122, dated October 11, 1853.

*To all whom it may concern:*

Be it known that I, JOHN A. ELDER, of Westbrook, in the county of Cumberland and State of Maine, have invented a new and useful machine for cutting pasteboard or other like substance for book-covers and other like purposes into any length and breadth at the same time; and I do hereby declare that the following is a full and clear description of the construction and operation of the same, reference being had to the annexed drawings, making a part of this specification, in which—

Figure I is a right hand side elevation; Fig. II left hand elevation with the frame removed; Fig. III front elevation; Fig. IV front view of the rolls V V; Fig. V front view of the rocker shafts C C; Fig. VI the end view of rolls and shears; Fig. VII front view of the shears, I, J, and shaft P.

The same letters refer to the same parts in all of the figures.

My invention is designed to take the place of the common mode of cutting paste board for book covers, this part of the operation of binding a book being done by my machine in much less time and in a more perfect manner than it has heretofore been done by hand, with common hand shears.

The principal features of my invention are imbued, first in the working of the rocker shaft and shears for the purpose herein described; second, in the working of the rollers as herein described.

The frame of the machine is shown at A A Figs. I and III within which are placed the rocker shafts *c c* seen in Figs. I—II—III—V and VI having a hole at each end to receive the axes D, D, the ends of which are supported in the frame A A the rocker shafts rocks on the axes D, D. On the shaft N there are four eccentrics H, H, H, H from which the connections or rods F, F, F, F pass up to the bars or arms G G one of the bars G passes along over the shears E and the other passes along under the shears. Those bars G G are made fast to the shears E by bolts. The series of shears E E are bolted to the rocker shafts *c c* with bolts *i i* in such a way that they may be moved to the right or left according to the size the board should be cut. The shears E E are closed together by the eccentrics H. The pieces B B are bolted on the frame A to hold the rolls V V and Z Z. The rolls V V are placed one above the other and geared together by the cog wheels W W. On the axis of the lower roll V is a ratchet wheel R and lever *o* there is on one end of this lever a pawl U which works the ratchet wheel R on the other end of this lever is jointed the connection or rod T which passes down to the crank or arm K this crank or arm is fastened to the shaft P. The rolls Z Z are placed one above the other and are geared together by the cog wheels *g* the cog wheel X is attached to the frame A with a stud and this cog wheel is geared into the cog wheels W and *g*. The shears I J are placed in between the rolls V and Z, the shear blade J is bolted to the pieces B which are bolted to the frame A, and the shear blade I moves up and down in a groove or slot cut into the pieces B on each end of the shear blade I is jointed the connection or rods E which pass down to the eccentrics M M those eccentrics are fastened to the shaft P. The cog wheels S S are fastened to the shafts N and P those wheels are geared one into the other. The rollers V V and Z Z are supported in the pieces B B and those pieces are bolted to the frame A A. The series of tables or arms Q Q are fastened to the bar or shaft Y in such a way that they may be moved along to the right or left. The bars or shafts Y Y Y support the two sides of the frame A A.

To operate this machine power is communicated to one of the shafts P or N and the paste board laid on the tables or arms Q and then moved into the series of shears E E which close and cut into the paste board then the board is moved to the rolls V V which take the board and move it to the shears I, J, the shear blade I is drawn down by the eccentrics M and at the same time I is drawn down the series of shears E cut into the paste board and when they are opening the pawl U turns the ratchet wheel R and this wheel turns the roll V and its gears turn the other rolls V and Z carrying with its rolls the paste board then the shears E E and I close and cut the paste board and in this way until the whole sheet of paste board is cut up.

What I claim to have invented and desire to secure by Letters Patent is as follows:—

1. The arrangement of machinery for cutting paste board into strips and those strips a given length at the same time.

2. The arrangement of the rocker shaft $c$, rolls V, V, Z, Z, and shears I, J, for the purpose above described.

3. I also claim the series of shears E, E, or its equivalent for the purpose herein described.

JOHN A. ELDER. [L. S.]

Witnesses:
JAMES PENNELL,
HENRY F. SANDS.